United States Patent Office 3,737,410
Patented June 5, 1973

3,737,410
METHOD OF ZINC-MODIFIED RESIN MANUFACTURE BY REACTING NOVOLAKS WITH ZINC DIBENZOATE
Hans J. Mueller, Brookville, Ohio, assignor to The National Cash Register Company, Dayton, Ohio
No Drawing. Filed Aug. 5, 1971, Ser. No. 169,542
Int. Cl. C08g 5/18
U.S. Cl. 260—59                                              9 Claims

ABSTRACT OF THE DISCLOSURE

A method (and product therefrom) of manufacturing zinc-modified phenol-formaldehyde novolak resins for use as color-developing materials in pressure-sensitive record sheet material. The method involves the use of zinc dibenzoate and a weak base, for treatment of the chosen novolak in a hot melt reaction.

This invention provides a method of manufacturing a zinc-modified phenolic resin of the type useful in the practice of the invention of Bruce W. Brockett, Robert E. Miller, and Mary L. Hinkle, which invention for Record Material is taught and claimed in the copending United States application Ser. No. 152,830, filed June 14, 1971. The record material of that invention included oil-soluble, basic, acid-colorable, colorless chromogenic material together with a colorless coreactant oil-soluble metal-modified phenol aldehyde resin and an oily liquid to hold the two in solution at the time of their color-forming reaction. The preferred metal-modified resin material of that invention is a zinc salt of a para-phenylphenol-formaldehyde novolak.

Useful zinc novolaks are as taught therein, readily made by heating a mixture of the novolak and zinc hydroxybenzoate or zinc acetylacetonate together in the absence of air to make a clear melt.

It is an object of this invention to make from cheap, readily-available zinc-containing materials, a zinc-modified novolak resin which is hard enough to be grindable to a free-flowing powder, which powder is readily suspendible in water to give a paper-coating slurry of good rheological characteristics, and which when coated on paper gives an improved color-developing, coreactant-material surface for use with colorless chromogens, particularly color-blocked triphenylmethane derivatives such as crystal violet lactone.

It is now found that the process, comprising heating and stirring a mixture of a novolak resin, a base, and zinc dibenzoate to give a clear melt, gives a consistently good modified resin of consistent zinc content, and excellent and reproducible rheology and grinding characteristics. These advantageous results are obtained with a cheap, readily available, starting material, zinc dibenzoate, which was not previously usable in a commercial process for the envisioned purposes, because of its relatively poor performance compared to the more expensive materials, zinc acetylacetonate and zinc hydroxybenzoate. The relatively poor performance of zinc-modified resin when it is made from zinc dibenzoate, according to known art procedures, is shown both in poor coating rheology and in the performance parameters: print intensity, print fade, print speed, and coreactant-surface sensitivity decline. The performance parameters are improved in the latter case over those shown by unmodified resin but not as much as is shown by zinc-modified resin made from zinc hydroxybenzoate, zinc acetylacetonate, or from zinc dibenzoate according to the method of this invention.

The process of this invention allows the making of zinc-modified resins from zinc dibenzoate that compare favorably in improved performance parameters and coating rheology with the best known zinc-modified resins which have heretofore been made with much more expensive starting materials.

The process of this invention is set out in detail below. All percents and parts herein are weight percents and parts by weight unless otherwise stated. The process of this invention includes the steps of mixing together about 50 to 150 parts of a novolak resin, about 5 to 12 parts of a solid alkaline material and about 10 to 15 parts of zinc dibenzoate, heating the mixture over a period of about 10 to about 90 minutes, preferably with stirring and preferably in an inert atmosphere, to give a clear melt.

The mixing and heating steps may be carried out simultaneously or in either order, but, in the generally preferred practice, the materials are mixed together as dry powders before heat is applied. Mixing is then continued during the heating step.

The preferred solid alkaline material is a weak base such as zinc hydroxide, ammonium carbonate or ammonium bicarbonate. Strong bases, such as potassium hydroxide, may be used in correspondingly lesser amounts.

The use of this process is best exemplified by the preparation of a zinc resinate in the following manner; the preferred example:

|                                         | Parts |
|-----------------------------------------|-------|
| Para-phenylphenol-formaldehyde resin    | 100   |
| Ammonium bicarbonate                    | 7.5   |
| Zinc dibenzoate                         | 12.5  |

The dry ingredients were mixed together (as coarse granular powder materials) and stirred under an atmosphere of helium while the temperature was raised over a period of about 30 minutes to about 170 degress centigrade. At this point the reaction material was a homogeneous, clear, melt. The reaction product was allowed to cool and was then ground under water in an attritor to give a fine particulate material suitable for use as the phenolic resin coreactant material in a pressure-sensitive paper-coating slurry.

Low-melting novolak resins need not be heated as high as 220 degrees centigrade. It is sufficient to heat the mixture of materials sufficient to give a melt for from about 10 to about 90 minutes, the longer times being used at the lower temperatures. However, the temperature may advantageously be raised well above the melting point of the mixture, at least about 140 degrees centigrade being a useful reaction temperature.

Th attritor-ground zinc-modified resin prepared above (having an average particle size of about 0.25 to about 5.0 microns) was used to make a paper-coating slurry of 30 percent solids content by mixing the following ingredients:

|                                  | Parts (dry) | Parts (wet) |
|----------------------------------|-------------|-------------|
| Zinc-modified resin              | 9.0         | 21.8        |
| Kaolin clay                      | 63.0        | 63.0        |
| Silica gel                       | 3.0         | 3.0         |
| Calcium carbonate                | 9.0         | 9.0         |
| Styrene-butadiene latex binder   | 6.5         | 13.0        |
| Cooked starch binder             | 9.5         | 95.0        |
| Water                            |             | 177.0       |
| Total                            | 100.0       | 381.8       |

Bond paper (33 pound base stock) was coated on an air knife coater (air-pressure 2.75 pounds/square inch) and dried, by a 12-second pass through a high-velocity-air oven at an average temperature of about 190 degrees Fahrenheit, to give a dry-coat weight of 4 pounds per ream of 500 sheets (25 by 38 inches) having a total area of 3,300 square feet.

Commercial "NCR Paper" CB sheets, having capsular coatings containing oily solution droplets of Crystal Violet (lactone (CVL) and benzoyl leuco methylene blue (BLMB), were coupled with the above CF sheets to make a mark-producing, transfer-receiving sheet couple.

The zinc-modified resins of this invention were found to be useful in making any and all of the zinc-modified-resin-containing pressure-sensitive transfer sheets, self-contained pressure-sensitive sheets and receiving sheets taught and claimed in the before-mentioned application, U.S. Ser. No. 152,830.

What is claimed is:

1. A method of manufacturing a product consisting essentially of a zinc-modified phenol-aldehyde novolak resin, comprising the steps of mixing and heating together, to make a melt, a composition consisting essentially of zinc dibenzoate, a weak base and a phenol-aldehyde novolak resin material.

2. The method of claim 1, wherein the mixture is protected while hot from exposure to the atmosphere.

3. The method of claim 1 wherein the weak base is selected from the group consisting of zinc hydroxide, ammonium carbonate and ammonium bicarbonate.

4. The method of claim 3 wherein the weak base is ammonium bicarbonate.

5. The method of claim 1 wherein the novolak resin is para-phenylphenol-formaldehyde resin.

6. The method of claim 1 wherein the materials are mixed before and during heating.

7. The method of claim 1 wherein the materials are heated to a temperature greater than about 140 degrees centigrade.

8. The method of claim 7 wherein the materials are heated for a period of about 10 minutes to about 90 minutes.

9. A zinc-modified phenol-aldehyde novolak resin prepared by the method of claim 1.

References Cited

FOREIGN PATENTS 1,097,132   7/1961   Germany.

OTHER REFERENCES

Chem Abstracts, vol. 55, 1961, 26533a–b, Wille et al.

HOWARD E. SCHAIN, Primary Examiner

U.S. Cl. X.R.

117—36.2, 155 L; 260—29.3